C. PHELON.
Vehicle Brake.
No. 71,054
Patented Nov. 19, 1867.
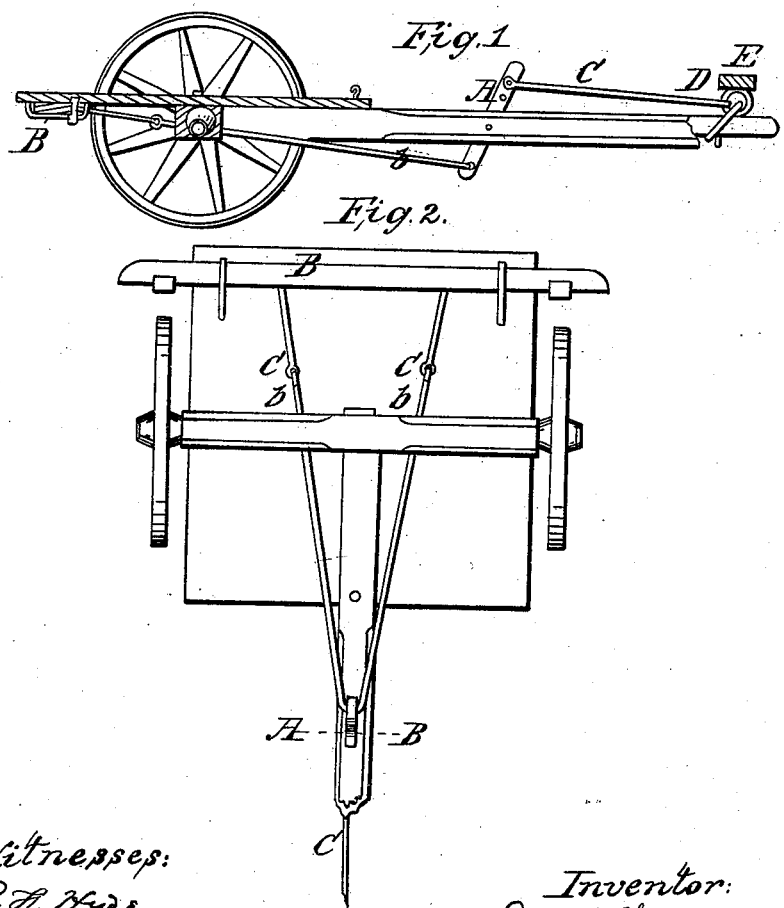

United States Patent Office.

CYRUS PHELON, OF WEST GRANVILLE, MASSACHUSETTS.

Letters Patent No. 71,054, dated November 19, 1867.

IMPROVEMENT IN BRAKE FOR VEHICLES.

*The Schedule referred to in these Letters Patent and making part of the same.*

TO ALL WHOM IT MAY CONCERN:

Be it known that I, CYRUS PHELON, of West Granville, Hampden county, Commonwealth of Massachusetts, have invented a new and useful Improved "Vehicle-Brake;" and I do hereby declare that the following is a full and exact description thereof, reference being had to the accompanying drawings, and to the letters of reference marked thereon. In the drawings—

Figure 1 is a side view of a cart having my brake attached, and

Figure 2 is a bottom view of the same.

This invention consists of a brake, which, when the cart is stopped, and the animals drawing it hold back, clamps the wheels so that they cannot move. It also brakes up the wheels when the cart is going down hill, and the animals holding back.

In construction, I place in the pole of the vehicle a lever, A, one arm of which extends above and one below the pole, the lever being pivoted in the centre of the pole, and working in a slot, $a$, cut through the latter for the purpose. The brake-bar B is arranged underneath the body of the cart, behind the wheels, and is connected with the lower end of the lever A by rods $b\ b$. To the upper end of the lever A is attached one end of a rod or bar, C, the other end of which is attached to the ring D of the yoke-bar E, the vehicle shown being an ox-cart.

The operation of this is as follows: When the oxen hold back, the bar C pushes back, the upper end of the lever A itself being operated by the yoke-bar D. This of course throws forward the lower end of the lever A, and draws the brake-bar forward against the wheel. The pressure against the wheels is immediately released upon the yoke-bar being pulled forward; and in going down hill, this device just equalizes the motion of the vehicle, braking it up as soon as it commences to run forward, and releasing itself when there is any pull upon the yoke. In the case of carriage and other horse-vehicles the breeching-straps next the pole may be attached to the upper end of the lever A. One of the principal advantages of this device, in the cases of carts, is that the body of the cart can be upset for the purpose of dumping the load, without interfering with the brake, or *vice versa*. For this purpose, the rods $b\ b$ are jointed or linked at $c\ c$. The whole apparatus may be made very light, so as to be applied to the most delicate vehicles.

Now, having described my invention, what I claim as new, and desire to secure by Letters Patent, is—

A brake for vehicles, in which the brake-bar B, having the shoes H arranged behind the wheels upon the body of the vehicle, is connected with the lower end of a lever, A, pivoted through the pole, the other end of said lever being operated by the holding back of the animals; the whole being arranged substantially as shown.

CYRUS PHELON.

Witnesses:
EDWARD H. HYDE,
R. F. HYDE.